Figure 1:
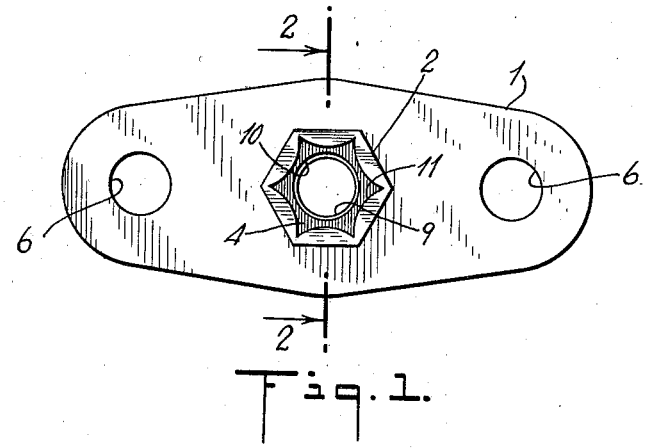

Nov. 27, 1945.    R. W. LUCE    2,389,989
ANCHOR NUT
Filed Dec. 9, 1942

INVENTOR
RICHARD W. LUCE
BY
*George T. Gill*
ATTORNEY

Patented Nov. 27, 1945

2,389,989

UNITED STATES PATENT OFFICE 2,389,989

ANCHOR NUT

Richard W. Luce, Southport, Conn.

Application December 9, 1942, Serial No. 468,343

2 Claims. (Cl. 151—7)

The invention herein disclosed relates to a threaded locking device of the kind in which an elastic washer is used to effect a locking action between engaging threads. More particularly, the invention relates to an anchor nut of this kind.

Anchor nuts include an outwardly extending flange which is provided with openings through which the nut may be riveted to a structural element, axial alined with a bolt opening through the structural element. Commonly, anchor nuts of the kind to which this invention relates have been made from round bar stock. The stock is headed to form the flange at one end of a section thereof. It is then bored and at one end counterbored to receive an elastic washer. The blank so formed is tapped, the washer is then inserted in the counterbore and the edge rolled over to secure the washer. These operations make the cost of such nuts comparatively high.

In accordance with this invention, there is provided an anchor nut of the kind to which the invention relates, the construction of which permits advantage to be taken of inexpensive nuts that are available on the open market and an anchor nut that is assembled out of inexpensive parts. The anchor nut of this invention consists of a strip of sheet metal stamped to form the flange, a case secured to the flange, as by welding for example, and a nut and washer assembled in the case.

Figure 2:
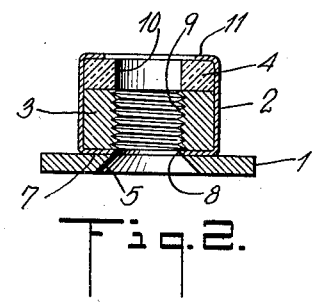

An anchor nut embodying the invention is illustrated in the accompanying drawing and described in detail below from which a clearer understanding of the invention may be had. The drawing includes:

Fig. 1 which is a plan of an anchor nut;

Fig. 2 which is a section of the same taken along the line 2—2 of Fig. 1; and

Figure 3:
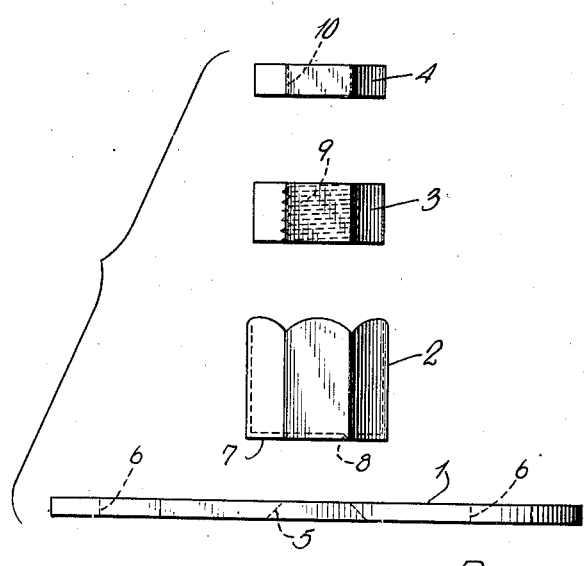

Fig. 3 which is an exploded view showing the parts in elevation.

The anchor nut illustrated in the drawing consists of a flange 1, a sheet metal case 2, a nut 3 and an elastic, fibrous washer 4. The flange 1 is stamped from sheet metal and it is provided with, centrally thereof, bolt-receiving opening 5, and spaced holes 6 through which rivets may extend for securing the flange to a structural element.

The case 2 is drawn from sheet metal into the form of a cup. It is hexagonal in transverse sections or in plan and initially open at one end. The end wall 7 of the case is pierced to form a bolt receiving opening 8 therethrough. This case is placed on the flange 8 with the opening through the end wall alined with the bolt-receiving opening through the flange. In this position, the end wall of the case is spot welded to the flange to secure the case to the flange.

The nut 3 is an ordinary hex nut which is available at low cost. The nut makes a close fit with the case and is forced into the case through the open end thereof. It is pressed into position with one face thereof engaging the end wall 7 of the case. The tapped opening 9 through the nut is alined with the bolt-receiving openings in the flange and in the end wall of the case. Due to the hexagonal configuration of the case and the nut, the nut is restrained against relative rotation with respect to the case.

The elastic, fibrous washer 4 is hexagonal and the opening 10 therethrough is of a diameter less than the major diameter of the thread of the nut and greater than the minor diameter of the thread of the nut. It is inserted in the case after the nut and makes a close fit with the case. As the washer is hexagonal, it is restrained against relative rotation with respect to the case and in consequence with respect to the nut.

After the washer is inserted in the case, that portion of the wall of the case that extends beyond the washer is turned in and forms an inwardly extending flange 11 which is compressed against the washer. This flange retains the nut and washer in assembled relation in the case.

From the foregoing description of the embodiment of the invention illustrated in the drawing, it will be apparent that by this invention there is provided an inexpensive anchor lock-nut of the kind in which an elastic washer is used to effect a locking action.

It will be obvious that various changes may be made by those skilled in the art in the details of the embodiment of the invention disclosed in the drawing and described in detail above within the principle and scope of the invention as expressed in the appended claims.

I claim:

1. An anchor nut of the kind that includes an elastic element for effecting a locking action with a bolt entered in the nut which anchor nut comprises in combination a strip of sheet metal forming a flange and having a bolt-receiving opening therethrough, a sheet metal, cup-shaped case of polygonal configuration in transverse section and having an opening through the end wall alined with the bolt opening through the flange, the end wall of the case being welded to the flange, a nut of like polygonal configuration as the case within the case with one face thereon abutting against the end wall of the case, and an elastic washer of like polygonal configuration as the case within the case, the end edge of the case being bent over forming an inwardly extending flange securing the nut and washer in the case.

2. An anchor nut of the kind having an elastic element for effecting a locking action with a bolt entered therein, which anchor nut comprises in combination a strip of sheet metal forming a flange and having a bolt-receiving opening therethrough, a sheet metal, cup-shaped case of hexagonal configuration in transverse section and having an opening through the end wall alined with the bolt opening through the flange, the end wall of the case being spot welded to the flange, and a hexagonal nut within the case with one face thereof abutting against the end wall of the case, and a hexagonal, elastic washer within the case and abutting against the nut, the end of the case being bent inwardly forming an inwardly extending flange securing the nut and washer in the case.

RICHARD W. LUCE.